V. A. BOND.
MEASURING PACKAGED FABRICS.
No. 188,279.  Patented March 13, 1877.
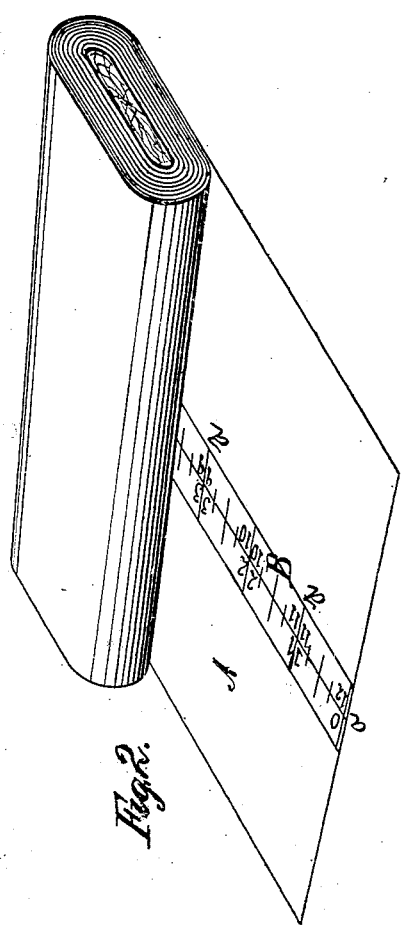
WITNESSES
Mary J. Utley
E. H. Bates
INVENTOR
Virgil A. Bond
ATTORNEYS

UNITED STATES PATENT OFFICE.

VIRGIL A. BOND, OF GREGG COUNTY, TEXAS, ASSIGNOR, BY MESNE ASSIGNMENTS TO EDWIN F. BEDELL.

IMPROVEMENT IN MEASURING PACKAGED FABRICS.

Specification forming part of Letters Patent No. 188,279, dated March 13, 1877; application filed November 27, 1875.

*To all whom it may concern:*

Be it known that I, VIRGIL A. BOND, of the United States of America, in the county of Gregg and State of Texas, have invented a new and useful Improvement, namely, a Device for the Measurement of Textile and other like Fabrics; and I do hereby declare that the following is a full and exact description of the same.

This invention has relation to improvements in devices for measuring textile and other like fabrics which are put up in rolls or bolts, or which are folded; and it consists in a strip of paper or other suitable material, upon which are printed or otherwise applied, above and below a longitudinal line, two scales, representing yards or fractions thereof, which strip is attached to and rolled up in the fabric, the scale above the line representing the amount or measurement of the goods in the bolt, roll, or fold, laid off in yards or fractions thereof from the inner end to the free end of the fabric, and the scale below the line representing the length of the goods from its outer to its inner end, whereby a convenient means is provided for determining the amount of goods in a bolt remaining unsold, and the amount sold, as will be hereinafter more fully described.

In the annexed drawings, the letter A represents strip of ribbon, wall-paper, or any other material, in connection with which I shall illustrate my invention. This strip is represented as twelve yards long; but it will be readily understood that it might be one hundred and twenty yards, or of any other desirable length, and that the measuring tape or strip will be of corresponding length with the goods. This tape is divided from end to end by a line, and is provided above and below the same with a scale, laid off in yards and fractions thereof, the upper scale commencing at the left of the strip and ending therewith, and the lower scale commencing at the right and ending with the said strip and fabric. This strip will be rolled up or folded in the fabric when the latter is put up into packages, and the number at the free end of the strip where the fabric ends will represent the quantity of goods in the package. Assuming the latter to contain twelve yards, and a demand being made for three yards, the clerk unrolls the bolt and cuts through the line numbered 3 in the lower scale. This cut will pass through the figure 9 in the upper scale, the latter figure representing the number of yards remaining in the piece. If four yards additional are required by the same or a different purchaser, the salesman adds four to three, and cuts through the figure 7 on the lower scale, thus also cutting through 5 in the upper scale, the latter figure being the quantity of the goods in the remnant.

It will be seen that, by adding the amount sold to the amount remaining, the original contents of the bolt may at any time be determined; also, that at a glance the quantity in the remnant may be obtained from the upper scale, thus greatly facilitating the operation of taking stock, and utterly doing away with the use of a yard-stick.

In practice, the positions of the contents-scale and of the quantity-sold scale may be changed—that is, the former may be below, and the latter above, the line—without changing the nature of my invention.

The scale-strip may be of paper, cloth, or of any other suitable material, and it may be arranged either on the selvage or at the center of the fabric, as I may elect. It is also pasted or otherwise suitably attached to the fabric, as I may choose.

What I claim as new, and desire to secure by Letters Patent, is—

1. The method of rendering packaged cloth accurately self-measuring by attaching a graduated strip permanently thereto by pasting or otherwise, and preferably on or near the edge of the cloth, substantially as described.

2. The flexible strip B, made of paper or other fabric, attached to the roll at its ends, and in the direction of its length having a central longitudinal line, $a$, and vertical lines $d\ d$, along which a scale representing the number of yards and fractions of yards, or other units of measure, contained in the roll are indicated, and said numbers being so arranged on each side of the vertical lines that they will indicate to the seller the number of yards or units of measure remaining in the roll, and the original number contained therein, and at the same time will indicate to the buyer the number of yards or other units of measure bought, substantially as described.

Signed October 4, A. D. 1875.

VIRGIL A. BOND.

Witnesses:
GEORGE E. UPHAM,
WALTER C. MASI.